United States Patent [19]

Seidel

[11] 3,883,827

[45] May 13, 1975

[54] TANDEM ARRAYS OF IN-PHASE COUPLERS

[75] Inventor: Harold Seidel, Warren, N.J.

[73] Assignee: Bell Telephone Laboratories, Incorporated, Murray Hill, N.J.

[22] Filed: May 2, 1974

[21] Appl. No.: 466,213

[52] U.S. Cl. .......................... 333/10; 333/11

[51] Int. Cl. .......................... H01p 5/04

[58] Field of Search .......... 333/10, 11; 330/53, 124, 330/149, 151

[56] References Cited

UNITED STATES PATENTS

| | | | |
|---|---|---|---|
| 3,452,300 | 6/1969 | Cappucci et al. | 333/10 |
| 3,490,054 | 1/1970 | Seidel | 333/10 |
| 3,514,722 | 5/1970 | Cappucci | 333/10 |

*Primary Examiner*—Paul L. Gensler
*Attorney, Agent, or Firm*—S. Sherman

[57] ABSTRACT

In theory, one can design an in-phase hybrid coupler having any arbitrary signal division ratio *k/t* as a function of frequency. The resulting network, as disclosed in the prior art, comprises a pair of frequency insensitive 3db hybrid couplers interconnected by means of two identical, reverse-connected antimetric networks. The problem, however, is that parasitics often make it difficult, if not impossible, to realize the required antimetric networks at the higher operating frequencies. This application discloses that any in-phase hybrid coupler can be synthesized as a tandem array of a plurality of in-phase hybrid couplers where each frequency-sensitive coupler circuit in the array contains a preselected simplified antimetric network that is more readily realizable over the frequency band of interest. In particular, the simplified network can be designed to incorporate component parasitics into the network itself, thus further extending the useful operating range.

15 Claims, 15 Drawing Figures

TANDEM ARRAYS OF IN-PHASE COUPLERS

This application relates to in-phase hybrid couplers having arbitrary power division ratios as a function of frequency.

BACKGROUND OF THE INVENTION

In long distance communication systems, amplifiers are spaced along the way to compensate for the losses incurred in the transmission line. That is, the amplifier gain characteristic is designed to have the same shape as the transmission line loss characteristic over the frequency band of interest. While this does not present a particular problem at the higher frequencies, considerable practical difficulties have been encountered in the design of broadband feed-forward amplifiers whose useful passband extends into the lower frequencies. A particularly difficult band to accommodate is one that ranges from 20 MHz and below, to 100 MHz and above. Briefly, the difficulty resides in the fact that the loss characteristics of a transmission line, expressed in decibels as a function of frequency, has an infinite slope at the origin, i.e., zero frequency, whereas the quadrature couplers used by applicant in his amplifier results in an amplifier characteristic which has zero gain and zero slope at the origin. As a consequence, the coupler networks are designed to produce a high degree of curvature over the lower frequency portion of the amplifier gain characteristic in order that the amplifier gain characteristic will match the transmission line loss characteristic over the higher frequency band of interest. While this curvature can be readily achieved in theory, it has been found to be very difficult, if not impossible, to realize in practice. Specifically, it has been found that the degree of coupling required of the quadrature couplers within the band of interest becomes too large to be practical.

In U.S. Pat. No. 3,763,437, one means of avoiding the above-described difficulty is disclosed. It involves the addition of a pedestal amplifier, and the partitioning of the overall gain between the pedestal amplifier and the frequency-shaped amplifier. By providing a prescribed gain at the lower frequencies, the gain characteristic at the lower frequencies is effectively shifted upward, away from the origin. This permits a more gradual matching of the gain and loss curves over the higher frequencies of interest.

An alternate solution to this problem would involve the use of frequency shaped in-phase power dividers which could be designed to have some finite transmission at zero frequency. This would be the equivalent of adding a pedestal amplifier which, as described in the above-cited patent, would make it easier to match the amplifier gain characteristic to the line loss characteristic.

A typical in-phase, frequency-shaped power divider comprises a pair of flat (i.e., frequency insensitive) 3db in-phase hybrid couplers interconnected by means of a pair of reverse-connected antimetric networks. (See, for example, "Synthesis of Linear Communication Networks" by W. Cauer; McGraw-Hill Book Company, Inc., 1958, page 577.) Here again, as above, we are faced with a practical problem. While the antimetric networks can be designed, in theory, to produce the desired overall signal division ratio ($t/k$) as a function of frequency, there is a practical problem in maintaining the nominal component values over the frequency band of interest.

It is, accordingly, the broad object of the present invention to effect broadband, in-phase signal division.

SUMMARY OF THE INVENTION

The present invention is based upon the discovery that any prescribed in-phase hybrid coupler signal division characteristic can be synthesized as a tandem array of a plurality of simplified in-phase hybrid couplers at least one of which has a signal division ratio that is frequency sensitive but different than said prescribed characteristic. In general, each frequency sensitive coupler in the array comprises a pair of flat (i.e., frequency insensitive) 3db, in-phase couplers interconnected by means of a pair of specified, reverse-connected antimetric networks. Alternatively, each frequency sensitive coupler can comprise an equivalent circuit derived from the general coupler circuit.

The advantage of using a tandem array of couplers to synthesize a prescribed characteristic instead of a single coupler network resides in the fact that in such an array, very much simplified antimetric networks, that are more readily realizable over extended frequency bands, can be used.

A further advantage of the present invention is that the simplified antimetric networks can be designed to incorporate significant circuit parasitics into the respective networks, thus further extending the useful operating range of the resulting power divider.

This and other objects and advantages, the nature of the present invention and its various features will appear more fully upon consideration of the various illustrative embodiments now to be described in detail in connection with the accompanying drawings.

DETAILED DISCUSSION

Figure 1:
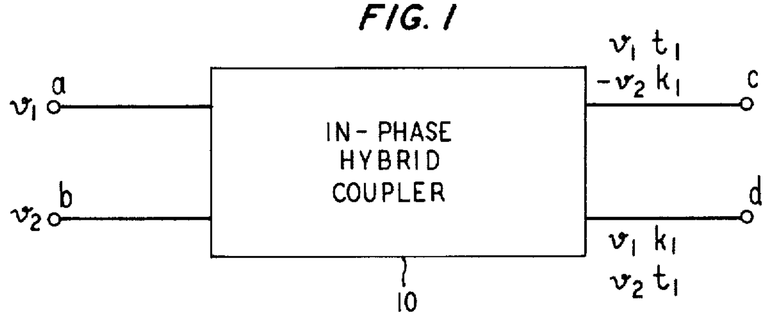
FIG. 1 shows in block diagram, an in-phase hybrid coupler.

Referring to the drawings, FIG. 1 shows, in block diagram, an in-phase hybrid coupler 10 having two pairs of conjugate ports $a$–$b$ and $c$–$d$. It is a characteristic of such couplers that an input signal $v_1$ applied to one port $a$ of one pair of conjugate ports $a$–$b$, produces output signals $v_1t_1$ and $v_1k_1$ at the other pair of conjugate ports $c$ and $d$, where $t$ and $k$ are, respectively, the coefficient of transmission and the coefficient of coupling for the coupler, and both are real numbers. On the other hand, an input signal $v_2$, applied in port $b$, produces output signals $-v_2k_1$ and $v_2t_1$ at ports $c$ and $d$, respectively.

It will be noted that for one input signal, applied to port $a$, the two output signals are in phase, whereas for the other input signal, applied to port $b$, the two output signals are 180° out of phase. Nevertheless, such couplers are referred to as "in-phase" couplers, or "hybrid couplers" to distinguish them from the quadrature or 90° couplers wherein the output signals are always 90° out of phase relative to each other.

Figure 2:
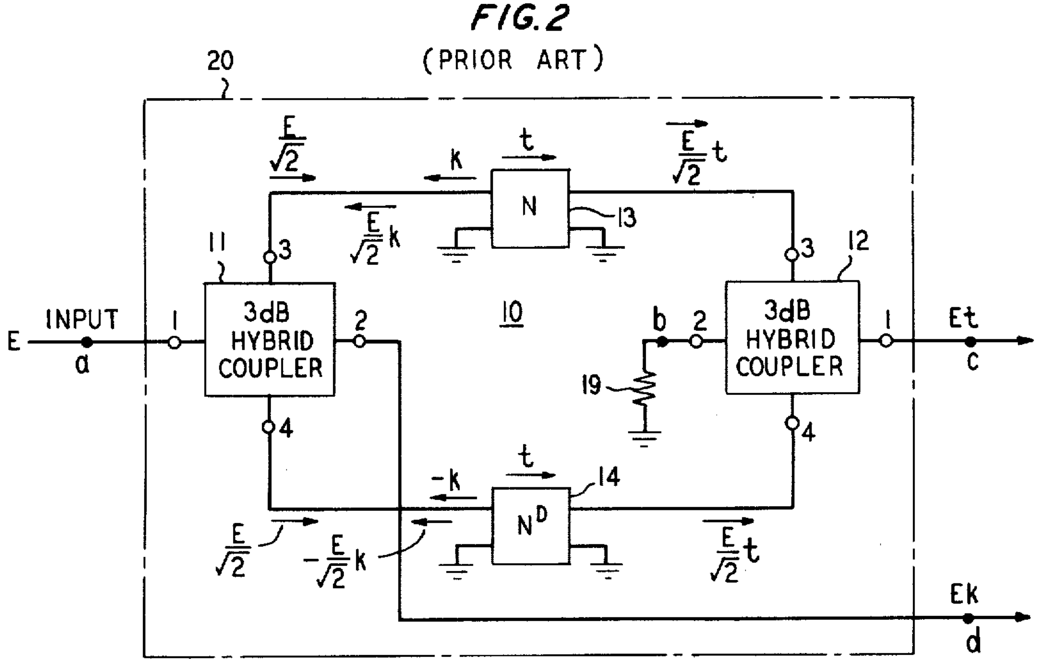
FIG. 2 (PRIOR ART)
FIG. 2 shows a frequency-sensitive hybrid coupler comprising a pair of flat 3db couplers interconnected by means of a pair of dual networks.

The coefficients $k$ and $t$ of an in-phase coupler, such as the magic-T or hybrid transformer, are relatively independent of frequency over a broad frequency range. Thus, to obtain an in-phase hybrid coupler having some prescribed frequency characteristic, separate frequency sensitive networks, external to the coupler, are provided. One such arrangement is illustrated in FIG. 2 which shows a generalized hybrid coupler 20 comprising a pair of flat 3db hybrid couplers 11 and 12, interconnected by means of a pair of frequency sensitive dual networks 13 and 14.

Each of the hybrid couplers 11 and 12 is an in-phase coupler having two pairs of conjugate ports 1–2, and 3–4, where ports 1 and 2 are the antisymmetric ports and ports 3 and 4 are the symmetric ports. That is, a signal applied to port 1 will be divided equally, producing two in-phase output signals in ports 3 and 4. Similarly, an input signal applied to port 2 will also be divided equally. However, the resulting output signals at ports 3 and 4 will be 180° out of phase. In FIG. 2, as in FIG. 1, ports $a$ and $b$ constitute one pair of conjugate ports of the overall coupler 20, and ports $c$ and $d$ constitute the second pair of conjugate ports. In FIG. 2 port $b$ is shown terminated by means of a matching resistor 19.

In operation, an input signal E, applied to port 1 of input coupler 11 is divided into two equal, in-phase components $E/\sqrt{2}$ at ports 3 and 4. Because networks 13 and 14 are dual networks, they have the same transmission coefficient $t$. Accordingly, they transmit equal signal components $Et/\sqrt{2}$ which combine in port 1 of output coupler 12 to produce a first output signal $Et$.

Because of their dual properties, the reflection coefficients of networks 13 and 14 have equal magnitudes but differ by 180°. Accordingly, the reflected signal from network 13 is $Ek/\sqrt{2}$ whereas the reflected signal from network 14 is $-Ek/\sqrt{2}$. Because of the above-noted properties of in-phase couplers, the reflected signals combine in port 2 of input coupler 11 to produce a second output signal $Ek$. No signal is coupled to port 2 of coupler 12.

From the above, it is apparent that the circuit shown in FIG. 2 is a hybrid coupler whose coefficient of transmission $t$ and whose coefficient of coupling $k$ are fully defined by networks 13 and 14. Because the relative phases of $k$ and $t$ are arbitrary, coupler 20, as defined thus far, is neither a quadrature coupler nor an in-phase coupler. To fall into either of these two specific classes of couplers, it is necessary to define networks 13 and 14 further.

As is known, any reactive two-port can be defined by a transfer matrix equation of the form $$\begin{vmatrix} E_1 \\ I_1 \end{vmatrix} = \begin{vmatrix} A & jB \\ jC & D \end{vmatrix} \begin{vmatrix} E_2 \\ I_2 \end{vmatrix}, \quad (1)$$

where $A$, $B$, $C$ and $D$ are real and, in general, unequal; and $E_1$, $I_1$ and $E_2$, $I_2$ are the input voltage and current, and the output voltage and current, respectively.

The ratio of the reflection coefficient to the transmission coefficient for this network is $$\frac{k}{t} = \frac{(A-D)+j(B-C)}{2}$$

As can be seen, this ratio can have any relative phase, depending upon the magnitudes of $A$, $B$, $C$ and $D$. In order for coupler 20 to be an in-phase coupler, the two-port networks 13 and 14 are selected such that $B = C$, in which case $k/t$ is real, being equal to $(A - D)/2$.

To recognize whether a two-port is such that $B = C$ and, thus, will produce an in-phase coupler, we note the following:

a. If a two-port is represented by $$\begin{vmatrix} A & jB \\ jC & D \end{vmatrix}, \quad (3)$$

its dual (*) is given by $$\begin{vmatrix} D & jC \\ jB & A \end{vmatrix}. \quad (4)$$

That is, the transfer matrix of the dual network has the $A - D$ and $B - C$ terms interchanged.

b. If a two-port is represented by matrix (3), its reverse ( ) is given by $$\begin{vmatrix} D & jB \\ jC & A \end{vmatrix}. \quad (5)$$

That is, if a two-port is reversed, the $A$ and $D$ terms of the transfer matrix are interchanged.

c. If now we take the network represented by matrix (3), form its dual and then reverse it (or, alternately, reverse it and then form its dual) we obtain the following matrix sequence:

$$\begin{vmatrix} A & B \\ C & D \end{vmatrix} \xrightarrow{*} \begin{vmatrix} D & C \\ B & A \end{vmatrix} \rightleftarrows \begin{vmatrix} A & C \\ B & D \end{vmatrix} \quad (6)$$

or $$\begin{vmatrix} A & B \\ C & D \end{vmatrix} \rightleftarrows \begin{vmatrix} D & B \\ C & A \end{vmatrix} \xrightarrow{*} \begin{vmatrix} A & C \\ B & D \end{vmatrix}. \quad (7)$$

It will be noted that in either case (6) or (7) the positions of $A$ and $D$ in the final matrix are the same as in the original matrix, whereas the $B$ and $C$ terms are interchanged. If, however, $B = C$, which is the condition for an in-phase coupler, the network matrix after being reversed and dualized is the same as the original network. Such networks are called "antimetric" networks.

The above provides a convenient test for the type of networks that can be used for form in-phase hybrid couplers. Briefly, if a two-port network is equal to the reverse of its dual (or the dual of its reverse), then $B = C$. Indeed, it is a sufficient and necessary condition for $B = C$.

Figure 3:
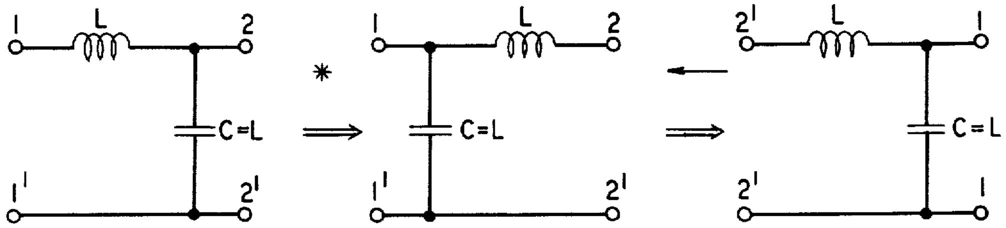
FIG. 3 shows an antimetric network.

For example, consider the two-port network illustrated in FIG. 3 comprising a series inductor $L$ and a shunt capacitor $C$ whose capacitance is equal to $L$. The dual of this network relative to a unit normalized impedance, is a shunt capacitor $C$, which replaces the series $L$, and a series inductor $L$, which replaces the shunt capacitor $C$. In the reverse of the dual network, the positions of the inductor and capacitor are interchanged, giving rise to the original network. That the $B$ and $C$ terms are, in fact, the same for this network is readily apparent from the transfer matrix of the original network, which is given by $$\begin{vmatrix} 1+p^2LC & pL \\ pC & 1 \end{vmatrix} . \qquad (8)$$

For $L = C$, $pL = pC$ as required.

Thus, using appropriate networks (i.e., antimetric networks) the circuit of FIG. 2 will have the characteristic of an in-phase coupler whose frequency characteristic is defined by networks 13 and 14. In particular, the coupler can be defined by the following matrix equation:

$$\begin{vmatrix} u_1 \\ u_2 \end{vmatrix} = \begin{vmatrix} t_1 & -k_1 \\ k_1 & t_1 \end{vmatrix} \begin{vmatrix} v_1 \\ v_2 \end{vmatrix} , \qquad (9)$$

where $k$ and $t$ are the network coefficients, and are functions of frequency;

and $v_1$, $v_2$, $u_1$ and $u_2$ are the signal voltages at the coupler ports $a$, $b$, $c$ and $d$, respectively.

Expressing each of the network coefficients $t_1$ and $k_1$ as the ratio of polynominals, we obtain $$t_1 = \frac{P_1}{\Delta_1} = \frac{a_0p^0+a_1p^2+a_2p^4 \ldots a_{n-1}p^{2(n-1)}+a_np^{2n}}{b_0p^0+b_1p^2+b_2p^4 \ldots b_{m-1}p^{2(m-1)}+b_mp^{2m}} , \qquad (10)$$

$$k_1 = \frac{Q_1}{\Delta_1} = \frac{c_0p^0+c_1p^2+c_2p^4 \ldots c_{s-1}p^{2(s-1)}+c_sp^{2s}}{b_0p^0+b_1p^2+b_2p^4 \ldots b_{m-1}p^{2(m-1)}+b_mp^{2m}} , \qquad (11)$$

where $p = i\omega$, and $n$, $m$ and $s$ are integers.

Output signals $u_1$ and $u_2$, are then given by $$\begin{vmatrix} u_1 \\ u_2 \end{vmatrix} = \frac{1}{\Delta_1} \begin{vmatrix} P_1 & -Q_1 \\ Q_1 & P_1 \end{vmatrix} \begin{vmatrix} v_1 \\ v_2 \end{vmatrix} . \qquad (12)$$

where $\Delta_1$ is the common denominator of the $t_1$ and $k_1$ functions.

Figure 4:
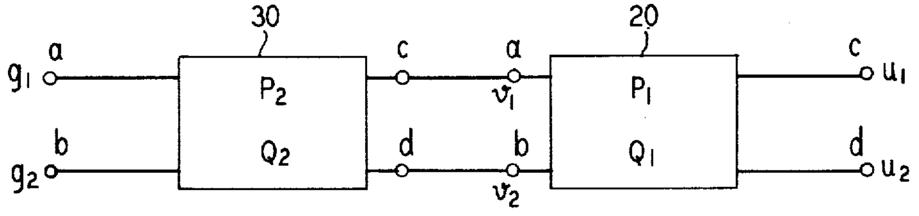
FIG. 4 shows a tandem array of two in-phase couplers.

If, input voltages $v_1$ and $v_2$ to coupler 20 are themselves derived from a preceding in-phase coupler 30, such as is illustrated in FIG. 4, the relationship between the input signals $g_1$, $g_2$ to coupler 30 and the output signals $u_1$ and $u_2$ from coupler 20 is then given by $$\begin{vmatrix} u_1 \\ u_2 \end{vmatrix} = \frac{1}{\Delta_1\Delta_2} \begin{vmatrix} P_1 & -Q_1 \\ Q_1 & P_1 \end{vmatrix} \begin{vmatrix} P_2 & -Q_2 \\ Q_2 & P_2 \end{vmatrix} \begin{vmatrix} g_1 \\ g_2 \end{vmatrix} , \qquad (13)$$

where $P_2/\Delta_2$ and $Q_2/\Delta_2$ define coupler 30.

In general, for a tandem array of a plurality of $z$ couplers, the relationship between the input signals $x_1$, $x_2$ and the output signals $u_1$ and $u_2$ is given by $$\begin{vmatrix} u_1 \\ u_2 \end{vmatrix} = \frac{1}{\Delta_1\Delta_2 \ldots \Delta_z} \begin{vmatrix} P_1 & -Q_1 \\ Q_1 & P_1 \end{vmatrix} \begin{vmatrix} P_2 & -Q_2 \\ Q_2 & P_2 \end{vmatrix} \cdots \begin{vmatrix} P_z & -Q_z \\ Q_z & P_z \end{vmatrix} \begin{vmatrix} x_1 \\ x_2 \end{vmatrix} . \qquad (14)$$

For purposes of discussion, let us consider only the two couplers of FIG. 4, as given by equation (13). If we perform the indicated matrix multiplication, we obtain an equivalent coupler matrix $$\begin{vmatrix} P_1P_2-Q_1Q_2 & -(P_1Q_2+P_2Q_1) \\ P_1Q_2+P_2Q_1 & P_1P_2-Q_1Q_2 \end{vmatrix} . \qquad (15)$$

We now note that if instead of a matrix representation, we characterize each coupler by the complex scalar notation $P_1+iQ_1$ and $P_2+iQ_2$, all the individual information about the couplers is retained. Furthermore, if we represent the tandem array by the product $(P_1+iQ_1)(P_2+iQ_2)$, and carry out the indicated multiplication, we obtain $$P_1P_2-Q_1Q_2+i(P_1Q_2+P_2Q_1) \qquad (16)$$

which contains all of the terms of the equivalent coupler matrix (15). Thus, we see that the scalar complex notation can be used equally well to define individual couplers and a tandem array of two or more couplers if we recognize that the real portion of the product corresponds to the major diagonal terms, and the imaginary portion corresponds to the off-diagonal terms. More generally, a tandem array of $z$ couplers can be represented by the scalar notation $$(P_1+iQ_1)\ (P_2+iQ_2)\ \ldots\ (P_z+iQ_z) \qquad (17)$$

What this states is that the desired overall frequency function of any in-phase coupler can be factored into a plurality of $z$ terms, and then synthesized by means of a tandem array of $z$ in-phase couplers. The advantage of this procedure is that the frequency sensitive network in each of the derived $z$ couplers can be a much simpler network and, as a result, each is more readily realized than the single network that would be required to produce the desired overall signal division characteristic in one coupler.

The above provides all the relationships necessary for synthesizing any given signal division ratio by means of an array of in-phase couplers. For purposes which will be explained hereinbelow, we select as one fundamental two-port for this purpose, a network 40 shown in FIG. 5 comprising, in cascade: an $N$:1 turns ratio transformer 50; a series capacitor 51; a shunt inductance 52;

and a second $N$:1 turns ratio transformer 53. By making the capacitance of capacitor 51 equal to the inductance $L$ of inductor 52, the transfer matrix of this network becomes $$\begin{vmatrix} N & 0 \\ 0 & \frac{1}{N} \end{vmatrix} \begin{vmatrix} 1 & \frac{1}{pL} \\ 0 & 1 \end{vmatrix} \begin{vmatrix} 1 & 0 \\ \frac{1}{pL} & 1 \end{vmatrix} \cdot \begin{vmatrix} N & 0 \\ 0 & \frac{1}{N} \end{vmatrix} . \quad (18)$$

Performing the indicated matrix multiplication, we obtain $$\begin{vmatrix} N^2 & \frac{1}{pL} \\ \frac{1}{pL} & \frac{1}{N^2}\left(1+\frac{1}{p^2L^2}\right) \end{vmatrix} . \quad (19)$$

Since the B and C terms of matrix (19) are equal, the given network is antimetric, and the ratio $k_1/t_1$ is real and is given by $$\frac{k_1}{t_1} = \frac{A-D}{2} = \frac{N^2 - \frac{1}{N^2}\left(1+\frac{1}{p^2L^2}\right)}{2} \quad (20)$$

We also know from equations (10) and (11) that the signal division ratio $k_1/t_1$ of a coupler utilizing network 40 is given by $$\frac{k_1}{t_1} = \frac{\frac{P_1}{\Delta_1}}{\frac{Q_1}{\Delta_1}} = \frac{P_1}{Q_1} \quad (21)$$

where $P_1$, $Q_1$ and $\Delta_1$ are even functions of frequency. As was also noted, the coupler matrix can be represented by $(P_1 + iQ_1)$. To ascertain the network parameters $L$ and $N$, we set $$P_1 + iQ = 0 \quad (22)$$

and solve for the ratio $$\frac{P_1}{Q_1} = -i . \quad (23)$$

Substituting for $P_1/Q_1$ from equations (20) and (21) we obtain $$\frac{P_1}{Q_1} = \frac{k_1}{t_1} = -i = \frac{\frac{1}{N^2p^2L^2} + N^2 - \frac{1}{N^2}}{2} = \frac{\zeta + L^2(N^4-1)}{2N^2L^2} \quad (24)$$

where $\zeta = 1/p^2$. Solving equation (24) for $\zeta$, we obtain as a root of equation (22)

$$\zeta = L^2(N^4 - 1) + i2N^2L^2 \quad (25)$$

where $\zeta$ includes a real part $$Re(\zeta) = L^2(N^4-1) \quad (26)$$

and an imaginary part $$Im(\zeta) = 2N^2L^2 \quad (27)$$

The component values $N$ and $L$ in network 40 are then given by $$N = \left(\frac{Re(\zeta) + |\zeta|}{Im(\zeta)}\right)^{1/2} \quad (28)$$

and $$L = \frac{Im(\zeta)}{[2(Re(\zeta) + |\zeta|)]^{1/2}} . \quad (29)$$

Thus, the values of $N$ and $L$ for each network of each coupler in the array of couplers are uniquely defined by the roots of each of the factors $(P_r + iQ_r)$ in equation (17).

Before considering a specific example, we note from equation (24) that for the particular basic network we have selected, the $P_1$ term is one degree higher in $\zeta$ than the $Q_1$ term. That is, the ratio $P_1/Q_1$ is of the form $$\frac{P_1}{Q_1} = \frac{\zeta + a}{b} . \quad (30)$$

The question then arises as to what can be done if $P_1$ and $Q_1$ are of the same order, such as $$\frac{P_1}{Q_1} = \frac{\zeta^n + a}{\zeta^n + b} . \quad (31)$$

To cope with this situation we consider the coupler given by $$\frac{P}{Q} = \alpha + \epsilon\zeta \quad (32)$$

where
$\alpha$ is a constant
$\epsilon$ is a variable parameter and
$\zeta = 1/p^2$.
Solving for $\zeta$, we obtain $$\zeta = \frac{\alpha}{\epsilon} + i\,\frac{1}{\epsilon} . \quad (33)$$

From equations (28) and (29), $N$ and $L$ are then given by $$L = \frac{\frac{1}{\epsilon}}{\left[2\left(\frac{\alpha}{\epsilon}\right) + \left(\frac{\alpha}{\epsilon}\right)^2 + \frac{1}{\epsilon^2}\right]^{1/2}} = \frac{\frac{1}{\epsilon}}{\sqrt{\frac{1}{\epsilon}}\ \sqrt{2\alpha + \sqrt{\alpha^2+1)}}}$$

$$N = \sqrt{\alpha^2+1} - \alpha. \quad (34)$$

In the limit, as $\epsilon$ approaches zero, $L$ approaches infinity, the network 40 reduces to an $N^2$:1 turns ratio transformer, where $N = \sqrt{\alpha^2+1} - \alpha$. This is the equivalent of a flat coupler of constant signal division ratio $\alpha$ given by $$\frac{P}{Q} = \frac{N^2 - \frac{1}{N^2}}{2} = \alpha, \qquad (35)$$

for which $P + iQ = \alpha + i$.

If we take the same reduced network, but reverse the transformer, we obtain a second coupler $$\frac{P}{Q} = \frac{\frac{1}{N^2} - N}{2} = -\alpha, \qquad (36)$$

for which $P + iQ = -\alpha + i$.

If we now employ these two flat couplers in tandem, the combined coupler is given by $$(\alpha + i)(-\alpha + i) = -(1 + \alpha^2) \qquad (37)$$

Since the resulting expression $-(1 + \alpha^2)$ in (35) is real, there is no signal division, and all of the input signal applied to the first coupler exits from a common port of the second coupler. Thus, the addition of these two couplers does not affect the net signal division ratio of the array. However, it does permit us to put the array function in the desired form. To illustrate, let us assume that the desired $P_n(\zeta)$ function and the desired $Q_n(\zeta)$ function are both polynomials of equal even degree $n$ in $\zeta$. It will be recalled, however, that it was noted that for the preferred basic network, the $P$ and $Q$ functions are of unequal degree in $\zeta$. If now we add to the array the two flat couplers described hereinabove, the array function becomes $$(\alpha + i)(\alpha - i)[P_n(\zeta) + iQ_n(\zeta)] \qquad (38)$$

Multiplying the second and third terms of (38), we obtain $$(\alpha+i)[\alpha P_n(\zeta)+Q_n(\zeta)]+i[\alpha Q_n(\zeta)-P_n(\zeta)] \qquad (39)$$

Expanding the polynomials $P_n(\zeta)$ and $Q_n(\zeta)$ in their explicit form $$P_n(\zeta) = p_n\zeta^n + P_{n-2}\zeta^{n-2} \qquad (40)$$

and $$Q_n(\zeta) = q_n\zeta^n + q_{n-2}\zeta^{n-2} \qquad (41)$$

we note that the $n$th degree term of the imaginary portion of equation (40) vanishes if $$\alpha = \frac{p_n}{q_n} \qquad (42)$$

and the equation reduces to the desired form, $$(P_n^1(\zeta) + iq_{n-2}^1(\zeta)) \qquad (43)$$

where the $Q^1$ function is of different order than the $p^1$ function.

The net coupler array is now of the reduced form $$\left(\frac{p_n}{q_n} + i\right)[P_n^1(\zeta) + iQ_{n-2}^1(\zeta)], \qquad (44)$$

comprising a tandem array of a flat coupler and a frequency-sensitive coupler which has the same signal division characteristic as the original even-degree coupler function.

Figure 5:
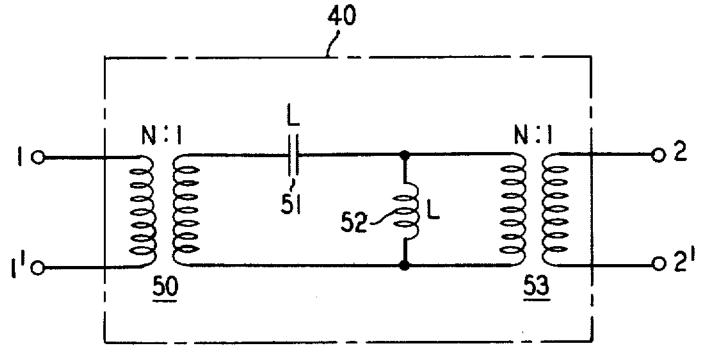
FIG. 5 shows a particular antimetric network.
Figure 6:
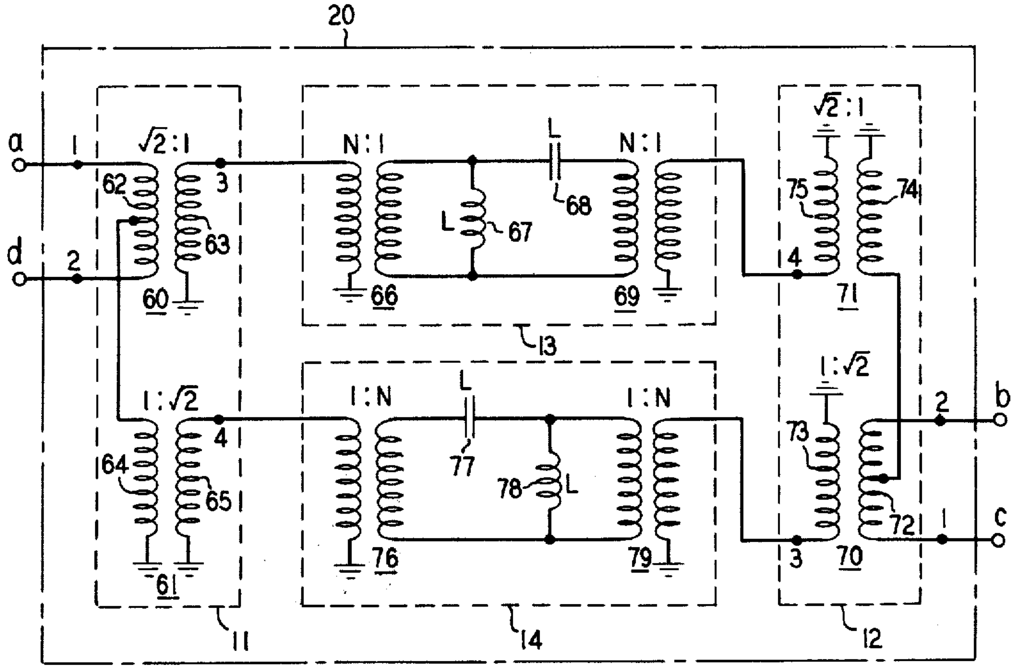
FIG. 6 shows a specific in-phase, frequency-sensitive hybrid coupler.

Before proceeding with a numerical example, a specific coupler circuit, incorporating the network illustrated in FIG. 5, will be considered. In particular, a pair of standard 3db transformer type hybrid couplers are used as the input and output couplers. Thus, using the same identification numerals in FIG. 6, as were used to identify elements of coupler 20 in FIG. 2, input hybrid coupler 11 comprises a pair of $\sqrt{2}$:1 turns ratio transformers 60 and 61 connected in the manner shown. Output coupler 12 similarly comprises a pair of $\sqrt{2}$:1 turns ratio transformers 70 and 71, similarly connected. In each coupler, ports 1–2 and ports 3–4 constitute the two pairs of conjugate ports.

A pair of antimetric networks 13 and 14 connect conjugate ports 3 and 4 of coupler 11 to a pair of conjugate ports 4 and 3 of the other coupler. The first of these networks 13, which connects port 3 of coupler 11 to port 4 of coupler 12, comprises, in cascade $N$:1 turns ratio transformer 66; a shunt inductor 67 having an inductance $L$; a series capacitor 68 having a capacitance $L$; and an $N$:1 turns ratio transformer 69.

The second network 14 is the reverse of network 13 comprising, in cascade: a 1:$N$ turns ratio transformer 76; a series capacitor 77 having a capacitance $L$; a shunt inductor 78 having an inductance $L$; and a 1:$N$ transformer 79.

Figure 7:
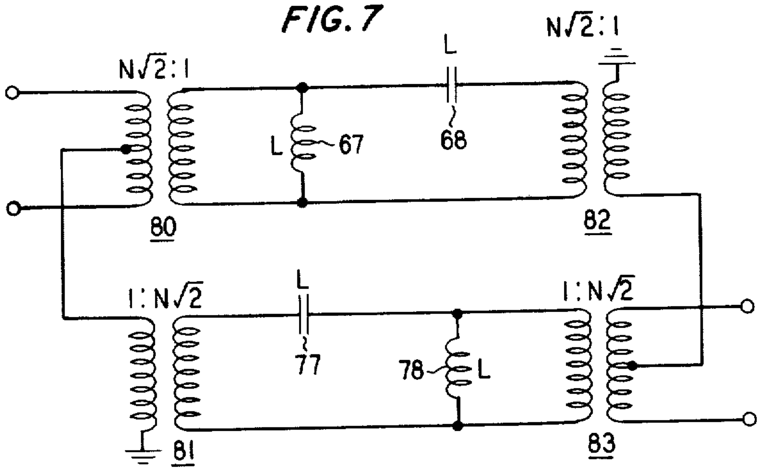
FIGS. 7, 8 and 9 show various modifications of the coupler shown in FIG. 6.
Figure 8:
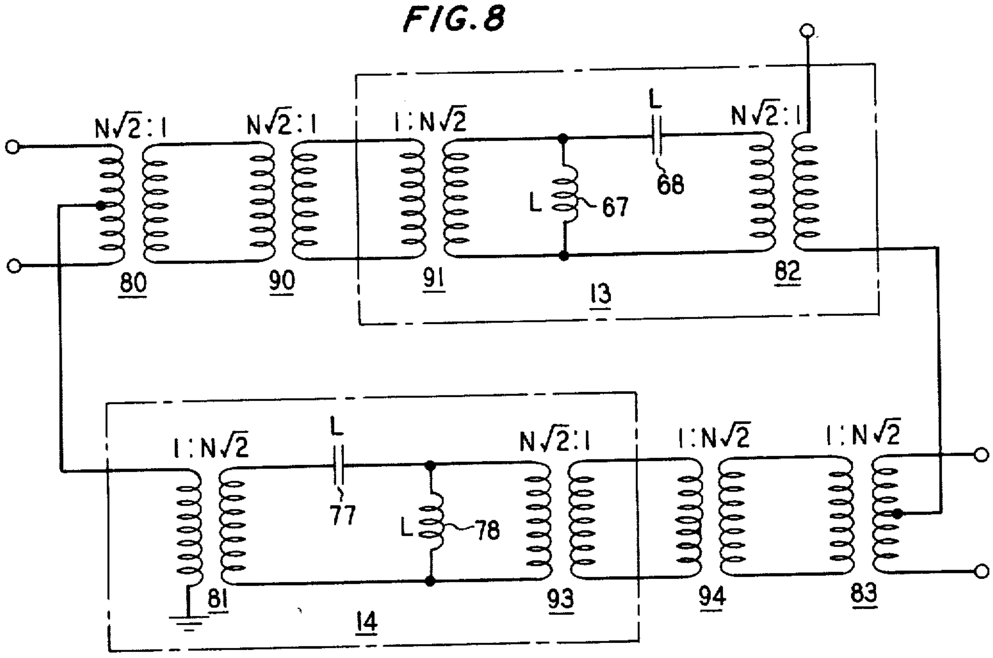

It will be noted that the resulting circuit includes four pairs of transformers connected in cascade. By a suitable readjustment of the turns ratios, these eight transformers can be replaced by four transformers, as illustrated in FIG. 7 where: transformers 60 and 66 are replaced by an $\sqrt{2}$:1 turns ratio transformer 80; transformers 61 and 76 are replaced by a 1:$N$ $\sqrt{2}$ transformer 81; transformers 69 and 71 are replaced by an $N\sqrt{2}$:1 transformer 82; and transformers 79 and 70 are replaced by a 1:$N\sqrt{2}$ turns ratio transformer 83.

Figure 9:
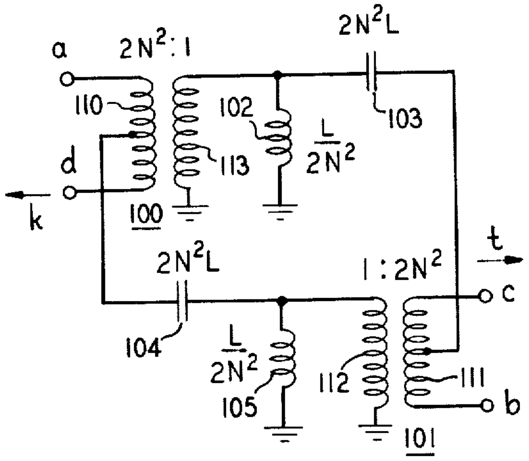

We now add to each of the networks 13 and 14 identity sections comprising a pair of transformers having inverse turns ratio. For example, in cascade with network 13 we add an $N\sqrt{2}$:1 turns ratio transformer 90, and a 1:$N\sqrt{2}$ turns ratio transformer 91. Similarly, in cascade with network 14 we add an $N\sqrt{2}$:1 turns ratio transformer 93, and 1:$N\sqrt{2}$ turns ratio transformer 94. It will be noted that in each case the net turns ratio of each pair of transformers is 1:1 and the networks are unaffected by their addition. However, their addition does permit a further circuit simplification by noting that by lowering the impedance levels of inductor 67 and capacitor 68 by the square of the turns ratio of transformers 91 and 82, the latter can be omitted. Similarly, by lowering the impedance levels of inductor 78 and capacitor 77 by the square of the turns ratio of transformers 81 and 93, the latter two transformers can also be eliminated. In addition, transformers 80 and 90 can be replaced by a single transformer having a modified turns ratio, as can transformers 94 and 83. The resulting simplified coupler circuit, shown in FIG. 9, comprises: two transformers having a primary to secondary turns ratio of $2N^2$:1; two shunt inductors 102 and 105 having an inductance $L/2N^2$; and two series capacitors 103 and 104 having a capacitance $2N^2L$. Capacitor 104 is connected between a center-tap on primary winding 110 of transformer 100 and one end of secondary winding 112 of transformer 101. The other end of winding 112 is grounded. Inductor 105 is connected in parallel with winding 112.

Similarly, capacitor 103 is connected between a center-tap on primary winding 111 of transformer 101 and one end of secondary winding 113 of transformer 100. The other end of winding 113 is grounded. Inductor 102 is connected in parallel with winding 113.

The ends *a–b* and *c–d* of the primary windings of transformers 100 and 101 constitute the two pairs of conjugate ports of the resulting hybrid coupler.

Figure 10:
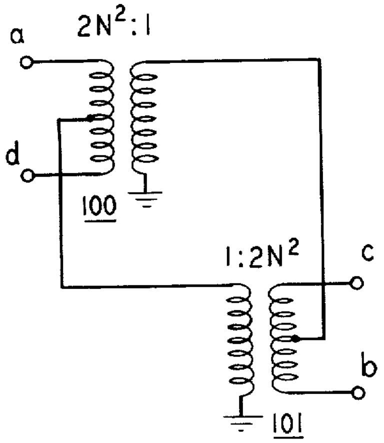
FIG. 10 shows a flat in-phase hybrid coupler.

FIG. 10 shows the flat coupler obtained when L becomes infinite. As explained above, by changing the turns ratio of the two transformers one can obtain an in-phase hybrid coupler of arbitrary signal division ratio, as given by equation (34).

EXAMPLE

To illustrate the above-described technique, let us synthesize a coupler array having a split ratio $$\frac{P}{Q} = 1 + p^4. \qquad (45)$$

Dividing numerator and denominator by $p^4$, and substituting $\zeta$ for $1/p^2$, we obtain $$\frac{P}{Q} = \frac{\zeta^2 + 1}{\zeta^2} \qquad (46)$$

from which we obtain the scalar representation $$P + iQ = (\zeta^2 + 1) + i\zeta^2. \qquad (47)$$

Noting that this is a case in which $P$ and $Q$ are of the same degree in $\zeta$, we multiply the scalar expression by the real factor $(\alpha + i)(\alpha - i)$, where, in this case, $\alpha = 1$ since the coefficient of $\zeta^2$ in both the real and imaginary portions of the scalar expression are equal to unity.

The resulting expression is now $$(1 + i)(2\zeta^2 + 1 - i) \qquad (48)$$

Factoring this expression, (i.e., solving for the roots of $\zeta$) and removing the common multiple 2, we obtain $$(1+i)[\zeta-(0.3218+i0.7769)][\zeta+(0.3218+i0.7769)] \qquad (49)$$

The first factor $(1 + i)$ represents a flat, 3db coupler for which $$2N^2 = 4.828.$$

The second factor, for which $$\zeta = 0.3218 + i\,0.7769,$$

corresponds to a coupler in which $$N = 1.223$$
$$L = 0.5095$$
$$2N^2 = 2.9932$$
$$2N^2L = 1.5249$$
$$L/2N^2 = 0.1702.$$

and

The third factor, for which $$\zeta = -0.3218 - i0.7769,$$

corresponds to a coupler in which $$N = 0.8174$$
$$L = 0.7625$$
$$2N^2 = 1.3364$$
$$2N^2L = 1.0189$$
$$L/2N^2 = 0.5706.$$

It will be noted that the real and the imaginary parts of one of the roots of $\zeta$ are both negative. A negative real part simply denotes an $N<1$, which results in a negative coefficient of reflection, i.e., $-k$.

A negative imaginary part is related to the manner in which the couple circuit was formulated. It will be recalled that the coupler matrix was given by $$\begin{vmatrix} P & -Q \\ Q & P \end{vmatrix}.$$

Figure 11:
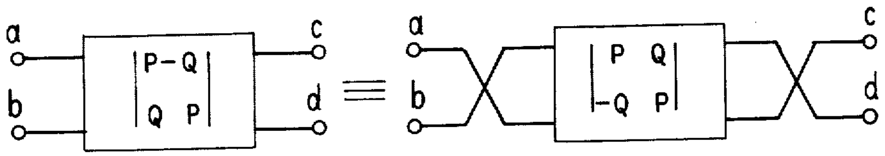
FIG. 11 shows the transposition of terminals to establish equivalency between couplers whose respective imaginary terms differ by 180 degrees.

When a root has a negative imaginary part, it is equivalent to a coupler matrix of the form $$\begin{vmatrix} P & Q \\ -Q & P \end{vmatrix},$$

wherein the $Q$ and $-Q$ are interchanged. To obtain the equivalent of the latter with a network having the former matrix representation involves only a transposition of ports. This equivalency is illustrated in FIG. 11.

Figure 12:
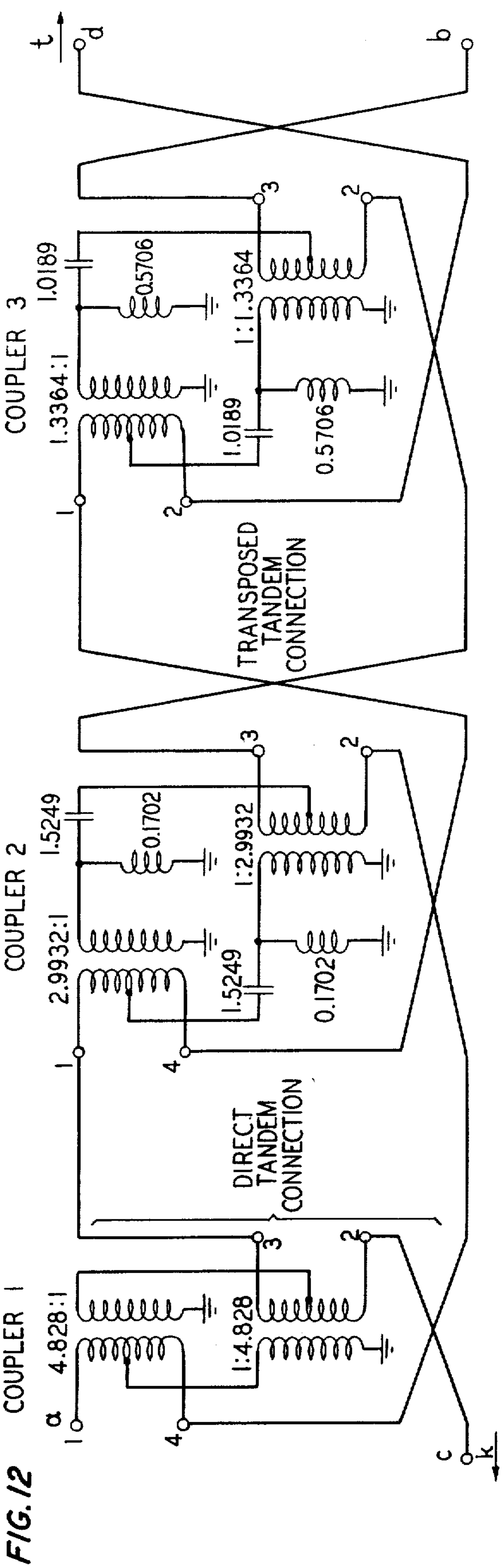
FIG. 12 shows a tandem array of in-phase couplers for producing a signal division ratio of $1 + p^4$.

Having fully defined each of the three component couplers in the array, the resulting structure for producing an equivalent in-phase coupler having the assumed signal division ratio is shown in FIG. 12. Component coupler 1 in the array is a flat, 3db coupler having two pairs of conjugate ports 1–2 and 3–4. One pair of conjugate ports 3 and 4 are connected, respectively, to a pair of conjugate ports 1 and 2 of component coupler 2 in the array in a direct tandem connection. The second pair of conjugate ports 3 and 4 of coupler 2 are, in turn, connected respectively to a pair of conjugate ports 2 and 1 of component coupler 3 in a transposed tandem connection.

Port 1 of coupler 1 and port 3 of coupler 3 constitute a pair of conjugate ports *a–b* of the resulting equivalent hybrid coupler. Port 4 of coupler 3 and port 2 of coupler 1 constitute the second pair of conjugate ports *c–d* of the equivalent coupler.

Figure 13:
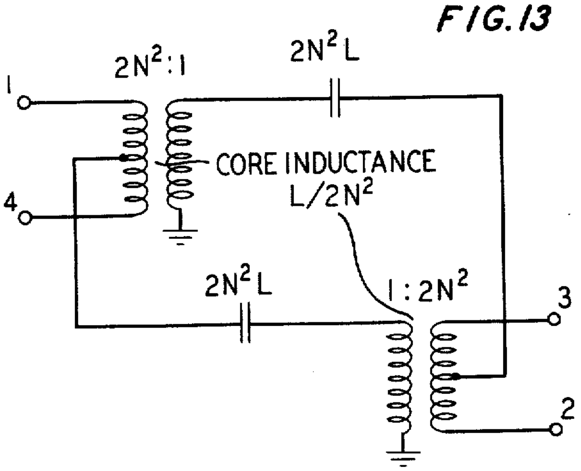
FIG. 13 shows a simplified coupler wherein the shunt inductors are incorporated into the core reactance of the transformers.

It will be noted that in each of the couplers 2 and 3 the inductor is in parallel with a transformer. It will also be noted that the equivalent coupler has an assumed $P$ to $Q$ ratio given by $1+p^4$. Thus, this coupler is intended to operate at the lower frequencies. In particular, at $p = 0$ it is a 3db coupler. This means that the transformers must be designed to have a large core reactance at very low frequencies. It will be recognized that this is difficult to achieve. The present invention totally avoids the problem by merging the shunt inductor with the transformer. Specifically, the transformer is designed to have a core reactance that is equal to that of the shunt inductor. This greatly eases the transformer design problem and eliminates the shunt inductor as a discrete element. Thus, the coupler circuits can be further simplified as illustrated in FIG. 13. (It should be noted that a flat coupler, consisting of only transformers, can be designed to compensate for existing parasitics. However, these techniques cannot be readily used in the case of a frequency-sensitive coupler which includes components other than transformers.)

It was stated earlier that one of the advantages of using an in-phase coupler as a frequency shaping element in an amplifier intended to compensate for transmission line loss is that it would eliminate the need for a separate pedestal amplifier having some finite gain at the lower frequencies. The reason a quadrature coupler produces zero gain at zero frequency becomes readily apparent when one examines the $k/t$ function for a quadrature coupler which has the form $$\frac{k}{t} = \frac{a_1p^1 + a_2p^3 \cdots a_np^{2n-1}}{b_op^o + b_1p^2 \cdots b_mp^{2m}} \qquad (50)$$

where $n$ and $m$ are integers.

In order for $k/t$ to be imaginary, as required in a quadrature coupler, the numerator of equation (50) must be an odd polynomial in $p$, and the denominator an even polynomial in $p$; or vice versa. As such, the ratio is either zero or infinite at $p = 0$.

By contrast, for an in-phase coupler, the $k/t$ function is the ratio of two even order polynominals, such as $$\frac{k}{t} = \frac{a_op^o + a_1p^2 \cdots a_np^{2n}}{b_op^o + b_1p^2 \cdots b_mp^{2m}} \qquad (51)$$

where $n$ and $m$ are integers. In this case, $k/t$ is equal to $a_o/b_o$ at $p = 0$, and can be made to have any desired value. Thus, an amplifier using in-phase couplers can be designed to have any finite gain at the lower frequencies, thereby eliminating the need for a separate pedestal amplifier.

Figure 14:
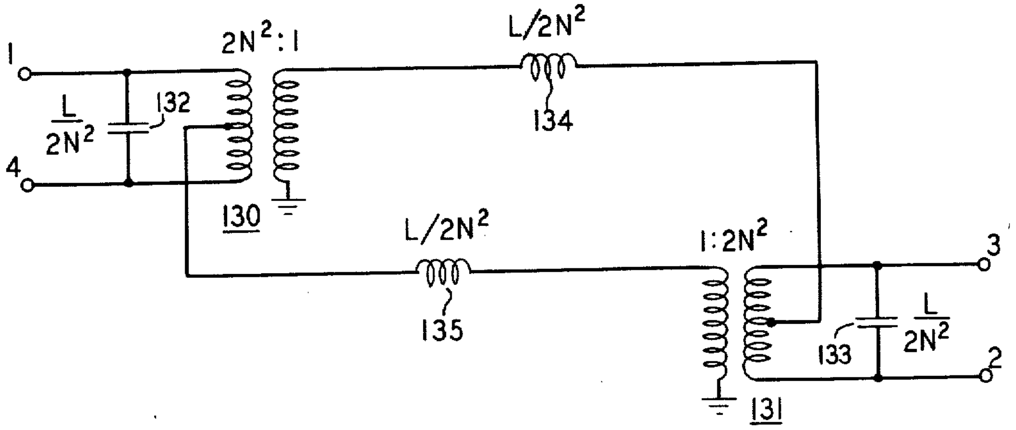
FIG. 14 shows an alternate embodiment of an in-phase coupler using a different antimetric network.

As is apparent from the above discussion, the resulting form finally assumed by the component couplers depends upon the configuration of the basis antimetric network selected. For example, if instead of using the network of FIG. 5, which comprises a series capacitor and a shunt inductor, we use the network of FIG. 3, including a series inductor and a shunt capacitor, one possible form of the resulting component coupler would be as shown in FIG. 14. Such a circuit configuration can be advantageously used to synthesize a high frequency coupler network. Since low-loss, high permeability materials are not readily available at the higher frequencies, transformers 130 and 131 in FIG. 14 will have a large number of turns. This, in turn, introduces a significant amount of spurious capacitance across the transformer which adversely affects performance at the higher end of the frequency band of interest. However, since the network capacitors 132 and 133 are in shunt with the transformers, the spurious capacitance can be included as part of the network capacitance. Similarly, the network inductors 134 and 135 are in series with the transformer leakage inductance and, as such, can be included as part of the network inductance. Indeed, the transformers can be specifically designed to have a shunt capacitance equal to $L/2N^2$ and a leakage inductance equal to $L/2N^2$ thereby eliminating any need for discrete network capacitors and inductors. More generally, however, the transformer parasitics will be included as part of the network components and the magnitudes of the latter reduced accordingly.

Figure 15:
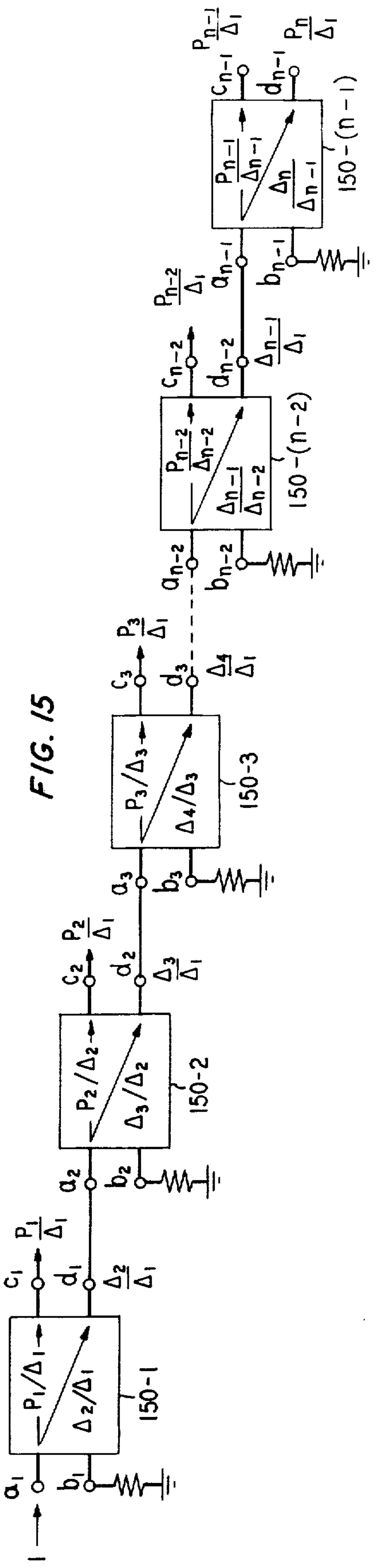
FIG. 15 shows an array of couplers for dividing a signal into more than two components.

Thus far we have only considered means for dividing a signal into two components $P_1/\Delta_1$ and $Q_1/\Delta_1$. We will now consider the more general case wherein the input signal is to be divided into $n$ components in the ratio $$\frac{P_1}{\Delta_1} : \frac{P_2}{\Delta_1} : \frac{P_3}{\Delta_1} \cdots \frac{P_{n-2}}{\Delta_1} : \frac{P_{n-1}}{\Delta_1} : \frac{P_n}{\Delta_1} \qquad (52)$$

as illustrated in FIG. 15.

Since the total output power is equal to the input power, we can write, for a normalized system, that $$1 = \left|\frac{P_1}{\Delta_1}\right|^2 + \left|\frac{P_2}{\Delta_1}\right|^2 + \left|\frac{P_3}{\Delta_1}\right|^2 \cdots + \left|\frac{P_{n-1}}{\Delta_1}\right|^2 + \left|\frac{P_n}{\Delta_1}\right|^2 \qquad (53)$$

or $$|\Delta_1|^2 = |P_1|^2 + |P_2|^2 + |P_3|^2 \ldots + |P_{n-1}|^2 + |P_n|^2 \qquad (54)$$

let us further define the additional parameters $\Delta_2$, $\Delta_3$ . . . $\Delta_n$ such that $$|\Delta_2|^2 = |P_2|^2 + |P_3|^2 \ldots + |P_{n-1}|^2 + |P_n|^2, \qquad (55)$$

$$|\Delta_3|^2 = |P_3|^2 \ldots + |P_{n-1}|^2 + |P_n|^2, \qquad (56)$$

$$|\Delta_{n-1}|^2 = |P_{n-1}|^2 + |P_n|^2, \qquad (57)$$

and $$|\Delta_n|^2 = |P_n|^2. \qquad (58)$$

To obtain the first signal, $P_1/\Delta_1$, the coupling coefficient between ports $a_1$ and $c_1$ of coupler 150-1 is $P_1/\Delta_1$. The coupling coefficient between ports $a_1$ and $d_1$ will then be $Q_1/\Delta_1$. However, from equation (53), extracting the power associated with signal component $P_1/\Delta_1$ the remaining power is given by $$1 - \left|\frac{P_1}{\Delta_1}\right|^2 = \frac{1}{|\Delta_1|^2}\left(|P_2|^2 + |P_3|^2 \ldots + |P_{n-1}|^2 + |P_n|^2\right) \quad (59)$$

or $$1 - \left|\frac{P_1}{\Delta_1}\right|^2 = \left|\frac{\Delta_2}{\Delta_1}\right|^2. \quad (60)$$

Thus, the output signal at port $d_1$ is $\Delta_2/\Delta_1$, or $$Q = \Delta_2. \quad (61)$$

Similarly, for any coupler **150-*i* of the succeeding couplers 150-2, 150-3, . . . 150-($n-2$) and 150-**($n-1$), the coupling coefficient between ports $a_i$ and $c_i$ is equal to $P_i/\Delta_i$, and the coupling coefficient between ports $a_i$ and $d_i$ is given by $\Delta_{i+1}/\Delta_i$.

In each case, the specific couplers can be in-phase couplers, synthesized as explained hereinabove, or quadrature couplers, synthesized as explained in my U.S. Pat. No. 3,723,913, or mixtures of in-phase and quadrature couplers.

SUMMARY

It has been shown that any prescribed in-phase hybrid coupler signal division ratio $k/t$, which varies as a function of frequency over a given frequency band of interest, can be synthesized by means of a tandem array of in-phase hybrid couplers. The simplest tandem array comprises two couplers, one of which has a signal division ratio that is constant over said band of interest and the other of which has a frequency sensitive signal division ratio over said band of interest which is different than said prescribed characteristic.

A more complicated array will include two or more frequency sensitive couplers, and may also include one frequency insensitive coupler.

The individual couplers in the array are arranged in ordered succession from first coupler to a last coupler by connecting the ports of one pair of conjugate ports of each coupler to the respective ports of one pair of conjugate ports of the next successive coupler in the array.

By appropriate preselection of the antimetric network, parasitics associated with the circuit components can be absorbed within the network, thus extending the operating frequency range. Two specific antimetric networks are illustrated.

In all cases it is understood that the above-described arrangements are illustrative of but a small number of the many possible specific embodiments which can represent applications of the principles of the invention. As explained hereinabove, numerous and varied other arrangements can readily be devised in accordance with these principles by those skilled in the art without departing from the spirit and scope of the invention.

What is claimed is:

1. An in-phase hybrid coupler circuit having a prescribed overall signal division ratio which varies as a function of frequency over a given frequency band of interest comprising:
   a tandem array of in-phase hybrid couplers at least one of which has a signal division ratio that varies as a function of frequency over said band of interest and is different from said prescribed signal division ratio.

2. The circuit according to claim 1 wherein each coupler in said array has a signal division ratio that varies as a function of frequency over said band of interest and is different than said prescribed signal division ratio.

3. The circuit according to claim 1 wherein said array includes one coupler whose signal division ratio is constant over said band of interest.

4. The circuit according to claim 1 wherein each of said couplers having a signal division ratio which varies as a function of frequency comprises:
   first and second identical hybrid couplers whose signal division ratios are substantially constant over said frequency range of interest;
   each of said first and second couplers having two pairs of conjugate ports;
   first and second identical two-port antimetric networks;
   said first antimetric network being connected between one port of one pair of conjugate ports of said first coupler and one port of one pair of conjugate ports of said second coupler;
   said second antimetric network being connected between the other port of said one pair of conjugate ports of said first coupler and the other port of said one pair of conjugate ports of said second coupler; and
   said networks being further connected between said first and second couplers such that each is reverse-connected relative to the other.

5. The circuit according to claim 4 wherein said antimetric networks include a series inductor and a shunt capacitor.

6. The circuit according to claim 4 wherein said antimetric networks include a series capacitor and a shunt inductor.

7. The circuit according to claim 1 wherein said one coupler comprises:
   first and second two-winding transformers, each having a primary and a secondary winding;
   one end of the secondary winding of each transformer being coupled to a center-tap along the primary winding of the other of said transformers by means of a series capacitor;
   the other end of each secondary winding being connected to a common function;

a first inductor connected in parallel with the secondary winding of said first transformer;

and a second inductor connected in parallel with the secondary winding of said secondary transformer;

the four ends of the two primary windings and said common function contributing the four ports of said coupler.

8. The circuit according to claim 7 wherein said first and second inductors are discrete circuit components.

9. The circuit according to claim 7 wherein said first and second inductors are the equivalent core inductors of said transformers.

10. The circuit according to claim 1 wherein said one coupler comprises:

first and second two-winding transformers, each having a primary winding and a secondary winding;

one end of the secondary winding of each transformer being coupled to a center-tap along the primary winding of the other transformer by means of a series inductor;

the other end of each secondary winding being connected to a common function;

a first capacitor connected in shunt with a winding of said first transformer;

and a second capacitor connected in parallel with a winding of said second transformer;

the four ends of the two primary windings and said common function contributing the four ports of said coupler.

11. The circuit according to claim 10 wherein said inductors and said capacitors are discrete circuit components.

12. The circuit according to claim 10 wherein the spurious transformer winding capacitance of said first and second transformers constitutes at least a portion of the capacitance of said first and second capacitors.

13. The circuit according to claim 10 wherein the leakage inductance of said first and second transformers constitutes at least a portion of the inductance of said first and second inductors.

14. An in-phase hybrid coupler circuit having a prescribed overall signal division ratio which varies as a function of frequency over a given frequency band of interest comprising:

an array of $n$ individual in-phase hybrid couplers;

characterized in that:

said individual couplers in the array are arranged in ordered succession from a first coupler to a last coupler by connecting the ports of one pair of conjugate ports of each coupler to the respective ports of one pair of conjugate ports of the next successive coupler in the array;

and in that the signal division ratio of each coupler over the frequency band of interest is different than said prescribed signal division ratio.

15. A signal divider having a signal division ratio $$\frac{P_1}{\Delta_1} : \frac{P_2}{\Delta_1} : \frac{P_3}{\Delta_1} \cdots : \frac{P_n}{\Delta_1}$$

over a specified frequency band of interest comprising:

a plurality of $n-1$ hybrid couplers, at least two of which have different signal division ratios over said band of interest;

each of said couplers having a coupling coefficient between a first port and a second port equal to $P_i/\Delta_i$, and a coupling coefficient between a first port and a third port equal to $\Delta_{1+1}/\Delta_i$, where $P_i$ is a polynomial function of the imaginary radian frequency $p$, and where $\Delta_i$ is a polynomial containing all of the negative real portion roots of the normalizing polynomial $$|\Delta_i|^2 = |P_i|^2 + |P_{i+1}|^2 \ldots + |P_{n-1}|^2 + |P_n|^2;$$

said couplers arranged in ordered succession from a first coupler to said $(n-1)$ coupler by connecting the third port of each coupler to the first port of the next successive coupler in the array;

the first port of said first coupler constituting the input port of said signal divider;

the second port of the first $n-2$ couplers in said array, and the second and third ports of the last coupler in said array constituting the $n$ output ports of said signal divider.

* * * * *